(12) United States Patent
Boettcher et al.

(10) Patent No.: US 10,514,919 B2
(45) Date of Patent: Dec. 24, 2019

(54) DATA PROCESSING APPARATUS AND METHOD FOR PROCESSING VECTOR OPERANDS

(71) Applicant: ARM Limited, Cambridge (GB)

(72) Inventors: Matthias Boettcher, Cambridge (GB); Mbou Eyole-Monono, Cambridge (GB); Giacomo Gabrielli, Cambridge (GB)

(73) Assignee: ARM Limited, Cambridge (GB)

( * ) Notice: Subject to any disclaimer, the term of this patent is extended or adjusted under 35 U.S.C. 154(b) by 606 days.

(21) Appl. No.: 14/601,598

(22) Filed: Jan. 21, 2015

(65) Prior Publication Data

US 2015/0254077 A1 Sep. 10, 2015

(30) Foreign Application Priority Data

Mar. 7, 2014 (GB) .................................. 1404037.2

(51) Int. Cl.
*G06F 9/30* (2018.01)

(52) U.S. Cl.
CPC ........ *G06F 9/30036* (2013.01); *G06F 9/3017* (2013.01); *G06F 9/30018* (2013.01); *G06F 9/30032* (2013.01); *G06F 9/30072* (2013.01); *G06F 9/30098* (2013.01)

(58) Field of Classification Search
CPC .................................................. G06F 9/30036
See application file for complete search history.

(56) References Cited

U.S. PATENT DOCUMENTS

| 4,841,438 | A | 6/1989 | Yoshida et al. |
| 5,903,769 | A | 5/1999 | Arya |
| 5,940,625 | A | 8/1999 | Smith |
| 7,739,482 | B2 * | 6/2010 | Nguyen ............ G06F 9/30061 712/220 |
| 2009/0172365 | A1 | 7/2009 | Orenstien et al. |

(Continued)

FOREIGN PATENT DOCUMENTS

| JP | 62-202264 | 9/1987 |
| JP | S62202264 A | 9/1987 |

OTHER PUBLICATIONS

GB Search Report for GB No. 1404037.2, dated Aug. 27, 2014, 4 pages.

(Continued)

*Primary Examiner* — Aimee Li
*Assistant Examiner* — William V Nguyen
(74) *Attorney, Agent, or Firm* — Nixon & Vanderhye, P.C.

(57) ABSTRACT

A data processing apparatus has processing circuitry for processing vector operands from a vector register store in response to vector micro-operations, some of which have control information identifying which data elements of the vector operands are selected for processing. Control circuitry detects vector micro-operations for which the control information specifies that a portion of the vector operand to be processed has no selected elements. If this is the case, then the control circuitry controls the processing circuitry to process a lower latency replacement micro-operation instead of the original micro-operation. This provides better performance than if a branch instruction is used to bypass the micro-operation if there are no selected elements.

24 Claims, 6 Drawing Sheets

(56) References Cited

U.S. PATENT DOCUMENTS

| | | | |
|---|---|---|---|
| 2012/0060015 A1* | 3/2012 | Eichenberger | G06F 15/8069 |
| | | | 712/4 |
| 2012/0089817 A1* | 4/2012 | Craske | G06F 9/30003 |
| | | | 712/208 |
| 2012/0216011 A1 | 8/2012 | Gove et al. | |
| 2012/0260075 A1* | 10/2012 | Henry | G06F 9/30174 |
| | | | 712/225 |
| 2013/0275482 A1* | 10/2013 | Abraham | G06F 17/10 |
| | | | 708/200 |
| 2013/0283022 A1* | 10/2013 | Sasanka | G06F 9/3001 |
| | | | 712/226 |
| 2013/0290683 A1* | 10/2013 | Brown | G06F 9/3017 |
| | | | 712/220 |

OTHER PUBLICATIONS

Search Report in corresponding Chinese Patent Application No. 201510091541.4 dated Jun. 5, 2018.

* cited by examiner

| Format | Vector | | | | Mask |
|---|---|---|---|---|---|
| F64 | --- | 32-bit | --- | 32-bit | 0101 |
| F32 | 32-bit | 32-bit | 32-bit | 32-bit | 1111 |
| | 3 | 2 | 1 | 0 | |

```
for x = 0 .... M
(
    for y = 0 .... N
    (
        process A[x], B[y]
    )
)
``` dispatch:

| 0 | vsetVM 0 | Write VM (0) |
| 1 | vmov vv1, vv0 | --- |
| 2 | ~~vadd vv2, vv1, vv1~~<br>vmov vv2, vv1 | Read VM (0) |
| 3 | vclearVM | Write VM (-1) |
| 4 | vstore r0, vv2 | Read VM (-1) |
| 5 | ... | ... |

FIG. 5

| Idx | Mask | 0-Flag |
| --- | --- | --- |
| 0 | 11110000 | false |
| 1 | 00000000 | true |
| 2 | 11111111 | false |
| 5 | ... | ... |

FIG. 6

| Idx | Mask | 0-Flag$_0$ | 0-Flag$_1$ |
| --- | --- | --- | --- |
| 0 | 1111 0000 | false | true |
| 1 | 0000 0000 | true | true |
| 2 | 1111 1111 | false | false |
| 5 | ... | ... | ... |

FIG. 7

| Idx | VL | 0-Flag$_0$ | 0-Flag$_1$ |
| --- | --- | --- | --- |
| 0 | 4 | false | true |
| 1 | 0 | true | true |
| 2 | 8 | false | false |
| 5 | ... | ... | ... |

FIG. 8

Issue:

| Idx | Instr. | Dst | Scr |
|---|---|---|---|
| 0 | vset | $VM_0$ | --- |
| 1 | vmov | vv1 | vv0 |
| 2 | ~~vadd~~ vmov | ~~vv2~~ vv2 | ~~vv1, VM_0~~ vv1 |
| 3 | vclear | $VM_0$ | --- |
| 4 | vstore | r0 | vv2, $VM_0$ |
| 5 | ... | ... | ... |

DATA PROCESSING APPARATUS AND METHOD FOR PROCESSING VECTOR OPERANDS

This application claims priority to GB Application No. 1404037.2, filed 7 Mar. 2014, the entire content of which is hereby incorporated by reference.

TECHNICAL FIELD

The present technique relates to the field of data processing. More particularly, the technique relates to a data processing apparatus and method for processing vector operands.

TECHNICAL BACKGROUND

It is known to provide a data processing apparatus which processes vector operands havingmultiple data elements, which can perform corresponding data processing operation (often in parallel) on each data element of the vector operand. In some cases, a vector processing operation may be associated with control information indicating which data elements of the vector operand should be processed. The processing operation may be applied only to selected elements indicated by the control information, and not to other elements. The present technique seeks to improve processing performance when handling this type of vector processing operation.

SUMMARY

A data processing apparatus comprises:
a vector register store configured to store vector operands comprising a plurality of data elements;
processing circuitry configured to perform vector processing using vector operands obtained from the vector register store; and
control circuitry configured to control said processing circuitry to perform the vector processing in response to vector micro-operations;
wherein in response to a vector micro-operation specifying a source vector register and a destination vector register of said vector register store and associated with control information indicating which data elements of a portion of the source vector register are selected elements to be processed by the processing circuitry, the control circuitry is configured to:
(a) detect whether the control information satisfies a predetermined condition indicating that said portion of the source vector register does not include any selected elements;
(b) if the control information does not satisfy said predetermined condition, control the processing circuitry to process said vector micro-operation to perform a predetermined processing operation using one or more selected elements of said portion of said source vector register, to generate a result to be stored to a portion of the destination vector register corresponding to said portion of the source vector register; and
(c) if the control information satisfies said predetermined condition, replace said vector micro-operation with a replacement micro-operation having a lower processing latency than said vector micro-operation and providing the same result for said portion of the destination register as said vector micro-operation in the case where the control information satisfies said predetermined condition, and control the processing circuitry to process said replacement micro-operation.

A data processing apparatus comprises:
vector register storage means for storing vector operands comprising a plurality of data elements;
processing means for performing vector processing using vector operands obtained from the vector register storage means; and
control means for controlling said processing means to perform the vector processing in response to vector micro-operations;
wherein in response to a vector micro-operation specifying a source vector register and a destination vector register of said vector register storage means and associated with control information indicating which data elements of a portion of the source vector register are selected elements to be processed by the processing means, the control means is configured to:
(a) detect whether the control information satisfies a predetermined condition indicating that said portion of the source vector register does not include any selected elements;
(b) if the control information does not satisfy said predetermined condition, control the processing means to process said vector micro-operation to perform a predetermined processing operation using one or more selected elements of said portion of said source vector register, to generate a result to be stored to a portion of the destination vector register corresponding to said portion of the source vector register; and
(c) if the control information satisfies said predetermined condition, replace said vector micro-operation with a replacement micro-operation having a lower processing latency than said vector micro-operation and providing the same result for said portion of the destination register as said vector micro-operation in the case where the control information satisfies said predetermined condition, and control the processing means to process said replacement micro-operation.

A method of processing data for an apparatus comprising a vector register store configured to store vector operands comprising a plurality of data elements, and processing circuitry configured to perform vector processing using vector operands obtained from the vector register store; comprises:
receiving a vector micro-operation specifying a source vector register and a destination vector register of said vector register store and associated with control information indicating which data elements of a portion of the source vector register are selected elements to be processed by the processing circuitry;
in response to the vector micro-operation, detecting whether the control information satisfies a predetermined condition indicating that said portion of the source vector register does not include any selected elements;
if the control information does not satisfy said predetermined condition, controlling the processing circuitry to process said vector micro-operation to perform a predetermined processing operation using one or more selected elements of said portion of said source vector register, to generate a result to be stored to a portion of the destination vector register corresponding to said portion of the source vector register; and
if the control information satisfies said predetermined condition, replacing said vector micro-operation with a replacement micro-operation having a lower processing latency than said vector micro-operation and providing the same result for said portion of the destination register as said vector micro-operation in the case where the control information satisfies said predetermined condition, and controlling the processing circuitry to process said replacement micro-operation.

Further aspects, features and advantages of the present technique will be apparent from the following description of examples, which is to be read in conjunction with the accompanying drawings.

BRIEF DESCRIPTION OF THE DRAWINGS

FIG. 5 shows a first example of replacing a vector micro-operation at a dispatch stage;

FIGS. 6 and 7 show two examples of storing a control indicator in a mask register file;

FIG. 8 shows an example of storing a control indicator in a vector length register file;

DESCRIPTION OF EXAMPLES

Figure 1:
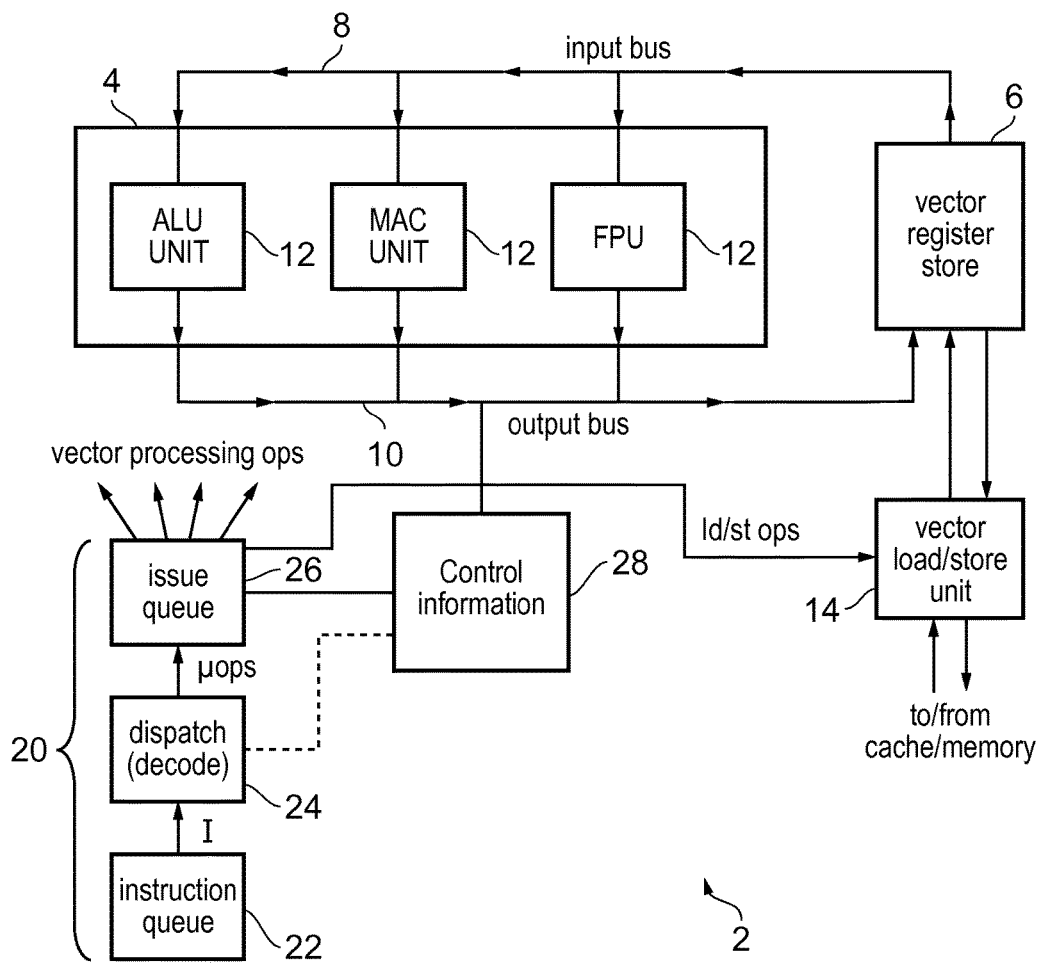
FIG. 1 schematically illustrates a data processing apparatus for vector processing.

The present technique recognises that it is possible for a vector micro-operation to be executed for which all data elements within a corresponding portion of the source vector register are non-selected elements which the control information indicates should not be processed by the processing circuitry. In this case, then processing the vector micro-operation may waste processing resource. A previous technique for addressing this problem has been for the programmer to include a "guarding" branch instruction prior to the vector micro-operation which tests whether the control information indicates that there are no selected elements to be processed, and if so then branches past the following micro-operation. However, the inventors of the present technique have found that such guarding branch instructions can often decrease performance rather improve it, because the branch operation is often subject to branch prediction, and branch mispredictions are common for the guarding branch operation because whether the branch is taken or not is highly data dependent. When a branch misprediction occurs, this requires the processing pipeline to be flushed and processing to be restarted from a previous point of the execution at which all state is known to be correct, which has a severe performance impact. Hence, often it is better to not include the guarding branch instruction at all, and instead simply process the vector micro-operation as normal even if it turns out that the control information does not specify any selected elements to be processed by the vector micro-operation.

Therefore, the present technique takes a different approach for accelerating such vector micro-operations. Control circuitry detects whether the control information satisfies a predetermined condition indicating that the relevant portion of the source vector register does not include any selected elements. If the control information does not satisfy the predetermined condition (i.e. there is at least one selected element in the relevant portion of the source vector register), then the control circuitry controls the processing circuitry to process the vector micro-operation so as to perform a predetermined processing operation using one or more selected elements of the portion of the source vector register, and generate a result which is stored to a portion of the destination vector register corresponding to the portion of the source vector register. Hence, when there is at least one selected element, the vector micro-operation is processed as normal. There is no need for an additional guarding branch instruction, and hence no risk of the guarding branch instruction being mispredicted causing a pipeline flush and a lack of performance.

On the other hand, if the control information is determined to satisfy the predetermined condition, i.e. there are no selected elements in the required portion of the source vector register, then the control circuitry replaces the vector micro-operation with a replacement micro-operation which has a lower processing latency and provides the same result as the original vector micro-operation in the case where the predetermined condition is satisfied. The control circuitry then controls the processing circuitry to process this replacement micro-operation. Hence, the hardware of the control circuitry is able to recognise when there are no selected data elements, and in this case replaces the vector micro-operation with a micro-operation which can be processed more quickly by the processing circuitry. Hence, performance can be improved.

Also, if the replacement micro-operation can be processed using a different processing unit to the vector processing unit that would normally process the original vector micro-operation, then this may also allow other vector micro-operations which do have selected data elements to be processed using the vector processing unit so that they can be processed earlier than would be the case if the original micro-operation had not been replaced. This can provide a further performance improvement.

The control circuitry may in some embodiments be part of the processing circuitry, or may be provided as separate circuitry.

The micro-operation may be any operation performed by the processing circuitry, which can be scheduled independently of other micro-operations. In some examples, each instruction fetched from memory may correspond to a single micro-operation sent to the processor, so that the micro-operations are simply program instructions. In many cases, however, there may be some complex program instructions which map to multiple micro-operations. For example, a load/store multiple instruction may map to multiple load/store micro-operations which can be scheduled independently. Also, a single vector program instruction for processing a vector operand may be mapped to several micro-operations which each process a different portion of the vector operand (for example, this allows processing circuitry with a narrower execution width to process larger vector operands).

The portion of the source vector register which is processed by the vector micro-operation (and which the control circuitry checks for selected data elements) may for some micro-operations be the entire source vector register, and for other micro-operations may be only a sub-section of the source vector register.

The replacement micro-operation may be one of a no-op micro-operation (a micro-operation which does not change any state in the vector registers), a micro-operation for setting at least a portion of the destination vector register to the same value as part of the source vector register (for example, a register move instruction), and a micro-operation for setting at least a portion of the destination vector register to a predetermined value (such as zero, or a value whose bits are all equal to 1). Surprisingly, the present technique recognises that it is often not sufficient to replace the vector micro-operation with a no-op micro-operation, as one may expect in the case when there are no selected data elements. This can be seen from the following examples.

With a first type of micro-operation, the processing circuitry may set parts of the destination vector register which correspond to non-selected data elements of the source vector register to a predetermined value, e.g. zero. In this case, it is not enough simply to perform a no-op micro-operation when the portion of the source vector is entirely made up of non-selected data elements, and instead the replacement micro-operation may be a micro-operation which sets the corresponding portion of the destination vector register to the predetermined value.

For a second type of vector micro-operation, the processing circuitry may set non-selected data elements of the destination register to the same values as the corresponding non-selected data elements of the source vector register.

In some cases the source vector register and the destination vector register may be the same. In this case, then the processing circuitry may replace selected data elements in the target register with the corresponding values determined by applying the processing operation to the selected data elements, while leaving the non-selected data elements with their original values. One might expect that, since the non-selected elements are being left with their original values, then in the case where all the elements in the portion of the register are non-selected elements, a no-op micro-operation may be sufficient for the replacement micro-operation. However, while this may be true for an in-order processor, for an out-of-order processor or other type of processor which uses register renaming, even if the source and destination registers specified by the micro-operation are the same, by the time the micro-operation reaches the processor the source and destination registers may have been mapped to different physical registers as seen by the processor. Hence, even when the source and destination vector registers specified by the micro-operation are the same, a replacement micro-operation which sets the portion of the destination vector register to the value of the corresponding portion of the source vector register may be used.

On the other hand, if different registers are specified as a source vector register and the destination vector register for the second type of vector micro-operation, then the replacement micro-operation may also be a micro-operation for setting the portion of the destination vector register to the value of the corresponding portion of the source vector register (the same as the register renaming example described above).

In another type of vector micro-operation, the values of portions of the destination vector register corresponding to non-selected data elements of the source vector register may be preserved. In this case, the replacement micro-operation may be a no-op micro-operation, or in the case where register renaming is used, a micro-operation which sets the portion of a new renamed register corresponding to the destination register to values of a corresponding portion of a register previously renamed as the destination register.

The control information may have various forms. In one example, mask information may be provided which specifies individual data elements or individual groups of data elements within the portion of the source vector register as selected data elements or non-selected data elements. In this case, then the control circuitry may determine that the predetermined condition is satisfied if the mask information indicates that none of the data elements in the portion of the source vector register are selected. The mask information may be stored in a special control register, or one of the general purpose registers, for example.

Another example of the control information is vector length information which indicates how many data elements are to be processed in response to the vector micro-operation. For example, it may be assumed that any data elements in positions greater than the last data element indicated by the vector length information may be non-selected elements. In this case, the control circuitry may determine from the vector length information whether the predetermined condition is satisfied based on whether the vector length information has one of one or more predetermined values (e.g. if a micro-operation operates on the upper half of a vector register which has 8 data elements, then the predetermined condition may be satisfied if the vector length is 4 or less). The vector length information may be stored in a control register for example, or could be included in the encoding of the micro-operation.

Also, the control information may comprise vector format information associated with the micro-operation. In one example, the vector format information could be information derived from the encoding of the micro-operation (for example information specifying a particular type of operation or a vector length to be processed with the micro-operation), which allows the control circuitry to determine the pattern of selected and non-selected data elements in the source vector operands. For example, a particular format identifier may indicate that only the first and third quarters of a vector register contain selected elements, with the second and fourth quarters being non-selected, and so if a micro-operation for processing the second or fourth quarter is associated with that format identifier, then the control circuitry may determine that the predetermined condition is satisfied and therefore replace the vector micro-operation with the replacement micro-operation as discussed above. In other examples, the vector format information may be stored in a control register, rather than being derived from the encoding of the micro-operation.

In many cases, there may be multiple pieces of control information maintained by the processing circuitry, so that different micro-operations can use different control information. For example, there may be a certain number of mask registers available for storing mask information. Therefore, the micro-operations may specify which control information should be used, and the control circuitry may check the relevant control information for the current micro-operation when determining whether to replace it with the replacement micro-operation.

In some cases, the control circuitry may maintain an additional control indicator which is separate from the control information that is associated with the micro-operation. While the control circuitry could determine whether the predetermined condition is satisfied directly from the control information, in some cases this may take some processing. For example, with the mask information then several bits of the control information may each need to be checked to determine whether all the data elements of the portion are non-selected. The control indicator is a single piece of information which indicates whether all the data elements in the required portion of the source vector register are non-selected, and so the control indicator can be checked more efficiently than the original control information. The control indicator may be updated each time the control information is updated. Often, after a given update of the control information, the control information is then used several times for different micro-operations or repeated instances of the same micro-operation before it is updated again. Therefore, by generating the control indicator each time the control information is updated, it is likely that the overhead of processing for determining the control indicator can be shared across several uses of the control information, so that it is not necessary to perform this processing every time the control information is used.

The processing circuitry may be part of a processing pipeline for handling micro-operations. The processing circuitry may correspond to one or more execution stages of the pipeline for example. In some examples, the control circuitry may correspond to one or more of the earlier stages of the pipeline for handling micro-operations up to the point where they are sent for processing by the processing circuitry. For example, the pipeline may have dispatch circuitry which decodes micro-operations and dispatches the decoded micro-operations to issue circuitry, and the issue circuitry then may queue the micro-operations while they wait for their operands to become available, and issue the micro-operations for processing.

The replacement of the micro-operation as discussed above may be implemented at different parts of the pipeline. In one example, the dispatch circuitry may perform the replacement. An advantage of this approach is that it is relatively simple for the dispatch circuitry to make the replace the vector micro-operation by dispatching a replacement micro-operation to the issue circuitry instead of the original vector micro-operation. On the other hand, at the point when the dispatch circuitry makes this decision then the control information required for the micro-operation may not be available yet, because it is still to be updated by an in-flight micro-operation at the issue stage or the processing stage of the pipeline. Therefore, sometimes the dispatch circuitry may not know whether the control information will satisfy the predetermined condition. To ensure that all micro-operations are processed correctly, the dispatch circuitry may use a conservative estimate of the control information, assuming that there is at least one selected element if the control information is not available yet, and hence dispatching the original vector micro-operation instead of its replacement. While the dispatch circuitry may not detect all cases where there are no selected elements in the portion of the register being processed, it can still provide a performance improvement by accelerating most instances of these micro-operations.

The dispatch circuitry could check the control information in order to make the decision of whether to replace the micro-operation. However, often the control information is held in a register file which is local to the issue circuitry or the processing circuitry, which may be slow to access for the dispatch circuitry. To reduce latency, it is desirable to reduce the amount of traffic passing between different stages of the pipeline. To address this, the dispatch circuitry may maintain a first control indicator indicating whether all data elements of the portion of the source vector are non-selected data elements, so that it can determine whether the predetermined condition is satisfied without checking the control information itself.

The issue circuitry may maintain a second control indicator in a similar way and may update its second control indicator in response to an update of the control information. To reduce traffic between the issue circuitry and the dispatch circuitry, when the control information is updated, then the issue circuitry may control the dispatch circuitry to update its first control indicator only if the update of the control information causes an update to the second control indicator. Hence, even if the control information is updated, this will not trigger the update to be propagated through to the dispatch circuitry unless it changes whether or not the replacement of the micro-operations should occur. That is, the first control indicator is updated only when the control information changes between indicating zero selected data elements for the relevant portion of the source vector register and indicating one or more selected data elements for that portion. A change of control information to indicate 4 selected data elements instead of 2 selected data elements, for example, would not cause an update of the first control indicator by the dispatch circuitry, because this change does not affect whether the replacement of the micro-operation is required.

Another way of reducing the number of updates that need to be propagated back to the dispatch circuitry is to initially set the first control indicator to indicate that not all of the data elements in the portion of the source vector register are non-selected elements (e.g. this can be done when an instruction that updates the control information is dispatched). The issue circuitry may then trigger an update of its first control indicator to be propagated through to the dispatch circuitry only if the control information changes so that there are now only non-selected elements in the portion of the register.

In other examples, the control circuitry may comprise the issue circuitry. The issue circuitry may detect whether the control information satisfies the predetermined condition, and if so, may replace the vector micro-operation with the replacement micro-operation. An advantage of this approach is that the control information will be available to the issue circuitry before the micro-operation leaves the issue circuitry, because the micro-operations in any case wait in the issue circuitry until they are ready for processing and all their operands are available. However, it can sometimes be harder to perform the replacement of the micro-operation at the issue queue than at the dispatch stage. For example, a processor may have separate issue queues associated with different vector processing units, and if the original micro-operation is in a different queue to the queue that would process the replacement micro-operation, then there may be a larger overhead associated with deleting the micro-operation from one queue and adding a micro-operation to the other. Nevertheless, this would still be possible. Also, to avoid this overhead, it is possible to add additional functionality to the processing unit which would normally perform the original micro-operation, so that it can also process the replacement micro-operation, and hence no change of issue queue would be required, making the replacement process simpler. In the case of a no-op micro-operation or a vector move micro-operation, this additional functionality may not require a large amount of circuitry, and so the small additional circuit area may be justified given the performance benefit of accelerating vector micro-operations for which there are no selected elements.

The present technique is particularly useful in systems which support vectors with different data element sizes and different numbers of data elements. In such a system, there may be some operand formats in which part of the operand is inactive because the operand contains smaller data elements which do not fully occupy the operand. In these cases, it can be useful to use control information to mark portions of the of operands as non-selected, and micro-operations which act on an inactive portion of the converted vector operand can be accelerated using the present technique.

The present technique may also be implemented in a virtual machine environment. A computer program stored on a recording medium can be provided which, when executed by a computer, provides a virtual execution environment which can process vector micro-operations in the way discussed above.

FIG. 1 schematically illustrates an example of a data processing apparatus 2 having processing circuitry 4 which supports vector processing. The processing circuitry 4 can process source vector operands received from a vector register store 6 via an input bus 8, and perform corresponding data processing operations on respective data elements of the source operands to generate a result vector operand output to the vector register store 6 via an output bus 10. The processing circuitry may comprise a vector processor which performs the operations on the respective data elements in parallel with one another, or a scalar processor which performs the operations sequentially rather than in parallel. The processing circuitry 4 includes several functional units 12 for performing different types of processing operations. In this example, the functional units 12 include an arithmetic logic unit (ALU) for performing ALU operations such as add, multiply, shift and logical operations, a multiply accumulate (MAC) unit for performing multiply accumulate operations and a floating point unit (FPU) for performing floating point operations. It will be appreciated that other types of functional unit may be provided. A vector load-store unit 14 is also provided for loading data from a cache or memory into the vector register store 6 and storing data from the vector register store 6 to the cache or memory.

The apparatus 2 also has control circuitry 20 for controlling the operations performed by the processing circuitry. The control circuitry 20 has an instruction queue 22 which receives instructions from the cache or the memory, a dispatch stage 24 which decodes the instructions to produce micro-operations to be processed by the processing circuitry 4, and dispatches the micro-operations to an issue queue 26. The micro-operations remain in the issue queue 26 until their operands and any control information required for performing the micro-operation become available, at which point the micro-operation is issued for processing by one of the processing units 12 of the processing circuitry 4, or by the load/store unit 14 if the micro-operation is a load/store micro-operation.

The micro-operations (μops) each correspond to the whole of an instruction or part of an instruction. Some instructions may be divided into multiple micro-operations corresponding to different operations to be performed, such as different loads/stores of a load/store multiple instruction, or different steps of a complex processing operation such as a vector scan operation for generating data values based on the combination of sequences of data elements from the source vector operand. Other instructions may be divided into separate micro-operations which process different portions of the source operands. For example, a vector operand may include 256 or 512 data elements, but may be divided into smaller chunks with different micro-operations processing 32 or 64 data elements at a time. Other examples may use vectors with 8 or 16 elements, and process them in smaller chunks of 4 or 8 elements at a time.

Figures 2, 3, 4:
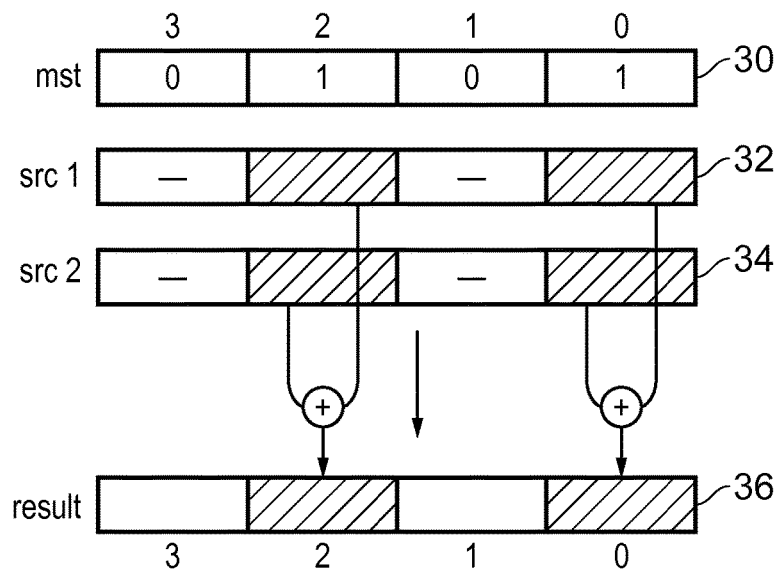
FIG. 2 shows an example of a vector micro-operation which processes selected data elements from a source vector operand.
FIG. 3 shows an example of a portion of a source vector register which only comprises non-selected data elements.
FIG. 4 shows an example of nested loops, which could lead to a vector micro-operation with a portion comprising no selected data elements.

The processing circuitry 4 has access to control information 28 which controls which data elements within the portion of the source registers to be processed by the micro-operation are selected elements to be processed. FIG. 2 shows an example in which the control information 28 comprises mask information 30 defining which data elements are selected data elements (1) and which data elements are non-selected (0). An add micro-operation adds the selected bit elements of two source operands 32, 34 and places the sum of each pair of elements in corresponding data elements of a result operand 36, which is written to the vector register store 6. The non-selected data elements of the source operands are not added, and so the corresponding elements (elements 1 and 3 in this example) of the results operand 36 are set to another value. Different modes for selecting the value of the non-selected portions of the result operand may be provided. In one example, the non-selected portions in result value may be set to a predetermined value such zero or a value with bits all set to one. In another example, the non-selected portions may take the value of the corresponding portion of the source register, or may retain the previous value of the corresponding portion of a destination register in the vector register store 6 for storing the result operand 36. While FIG. 2 shows an example where the control information 28 is mask information 30, in other examples the control information may be vector length information specifying the length of the portion of the source register containing selected elements, or format information which identifies a particular pattern of selected/non-selected data elements.

There are situations in which it is possible that a micro-operation to be processed by the processing circuitry 4 has control information 28 specifying that none of the data elements in the portion of the source register to be processed are selected elements. Such micro-operations are referred to below as "zero length" micro-operations (because they can be indicated by a vector length parameter of zero, although it is also possible to indicate zero length micro-operation using mask information or other control information). FIG. 3 shows a first example in which zero length micro-operations may arise. The processing circuitry 4 may support different data element sizes, so that a data register may for example be divided into four 32 bit data elements (as shown in the F32 format of FIG. 3) or two 64 bit data elements. As shown in FIG. 3, there may also be a format F64 in which two 32-bit data elements are placed in portions 0 and 2 of a 128-bit register, but the 32-bit portions 1 and 3 are inactive. This can be useful for simplifying casts between double and single precision floating point values, for example, to allow the use of simpler (often faster) single precision hardware for computations. Without the predication provided by the masks shown in FIG. 3, the entire F64 value would be propagated through the functional units 12 of the processing circuitry 4, which would mean that half the datapath would be activated unnecessarily. By using the mask to indicate that the portions 1 and 3 of the F64 value are non-selected elements, processing resource for processing these elements can be saved. Therefore, a micro-operation which operates on one of the portions 1 and 3 is a zero length micro-operation because it does not have any selected data elements to process.

FIG. 4 shows another example in which there are nested loops where a certain processing operation using elements of arrays A[x], B[y] iterates over two variables x and y. Vector processing can be used to combine multiple different iterations of the loop into a single micro-operation. For example, 512 iterations of a loop can be processed using a 512-element vector. However, often the loop may need to iterate through a number of repetitions that is not an exact power of 2 (760, for example). In this case, then while 512 of the iterations can be processed using a fully occupied vector of 512 elements, there are 248 iterations remaining which do not completely fill a 512-element vector, and so much of the vector will be made up of non-selected elements. This problem gets larger as the vector size increases, since the greater the number of elements in the vector, the larger the gap between successive powers of two, and so the more likely that a loop will include a vector operation performed using a vector for which there are many non-selected elements. This may not be a significant problem for a single loop, since only the final vector operation for the loop would be carried out using an incomplete vector. However, when there is a nested loop such as the one shown in FIG. 4, then on each iteration of the outer loop, the final step of the inner loop may process an incomplete vector, and so if the outer loop is iterated many times then the processing of zero length micro-operations can cause a significant performance loss.

Another situation in which zero length micro-operations can arise is if vector operations using larger vectors are partitioned into separate vector micro-operations each processing a smaller chunk of the vector, so that processing circuitry with a narrower bit width for its execution paths can be used. For example, although the vector register file 6 may support 128-element vectors, to reduce the circuit area the processing circuitry may have a data path which can only process 64-element vectors. In this case, then the 128-element vector may be processed in two passes through the processing circuitry. The fact that the 128-element is processed in separate passes may not be visible to the programmer, who may have specified a 128-element vector processing instruction. This instruction can then be mapped to micro-operations with control information indicating that one half or the other half of the vector operand contains non-selected elements. Hence, there may be some micro-operations which process portions of the register which are entirely made of non-selected elements.

Therefore, zero-length micro-operations may occur reasonably frequently. The processing operation to be performed if there is at least one selected element may require several processing cycles to complete. For example, multiply-accumulate operations performed by the MAC unit, or floating point operations performed by the FPU, may require several cycles. If a zero-length micro-operation is issued to one of these units, then this may cause a delay of several cycles before the result of the zero-length micro-operation becomes available for other micro-operations, and can prevent other micro-operations from using the same processing unit 12 in the meantime, which can cause a loss of performance. The present technique realises this is unnecessary because the zero-length micro-operation can be replaced with a faster micro-operation.

The control circuitry 20 identifies when the control information 28 meets a predetermined condition which indicates that the portion of the source register to be processed only comprises non-selected elements, and if so, then the control circuitry 20 replaces the micro-operation with a replacement micro-operation which can be processed in fewer cycles than if the original micro-operation was issued. The table below shows examples of different types of replacement that can be made.

| Instruction Type | Zeroing | Destructive & merging | Non-Destructive & merging 1 | Non-destructive & merging 2 |
|---|---|---|---|---|
| Description | Non-selected elements of the destination register are set to zero. | One source register implicitly acts as destination register. Non-selected elements of the vScr/vDst register are preserved. Due to register renaming, out-of-order (O3) processors may need to copy elements from the original (prior renaming) to the new (after renaming) register. | Allow separate operands for source and destination registers Non-selected elements of the vDst register are preserved | Allow separate operands for source and destination registers. Non-selected elements of the destination register are replaced by corresponding elements of a source register. |
| Replace with | "vmov vDst, 0" | In-order: NOP O3: "vmov vDst$_{new}$, vDst$_{org}$" | In-order: NOP O3: "vmov vDst$_{new}$, VDSt$_{org}$" | "vmov vDst, vSrc" |
| Dependencies | None | In-order: None O3: vDst$_{org}$ | VDSt$_{org}$ | vSrc |

The vector move micro-operation "vmov" or no-op micro-operation "NOP" can generally be processed in fewer cycles than a more complex micro-operation which requires processing of the source data elements to generate a result value, and so by replacing the original operation with one of these micro-operations processing can be accelerated. The potential performance gained from the substitution of zero length vector micro-operations with the replacement micro-operations depends on the latency and availability of the underlying functional units 12. For example, a given vector functional unit 12 may requires 3 or more cycles, while a vector move micro-operation may be performed in 2 cycles, allowing at least one cycle to be saved. Also, if the processing circuitry 2 possesses dual issue capability as well as two permutation functional units for performing vector move micro-operations, up to two zero length micro-operations could be accelerated in parallel, leaving the originally targeted functional units 12 free to be used by other instructions.

Note that under most circumstances it is not sufficient to replace the micro-operation with a no-op operation. Instead, a vector move (vmov) instruction can be used to ensure that the destination register takes the correct value. This is particularly the case in an out-of-order processor where register renaming may have taken place and so even if the source and destination registers are the same, the register renaming may map these to different physical registers, and so the vector move instruction may still be required. Also, note that even when the control information indicates that all elements in the required portion are non-selected elements, there may still be a data dependency requiring the micro-operation to wait for a result of an earlier instruction. This occurs if the destination register is different to the source register (or has been mapped to a different register by register renaming), and the non-selected portions of the destination register are being set to the same value as corresponding portions of the source register. The "destructive & merging" case shown above is a special case in which, by assuming that inactive elements of the destination register are replaced by elements from the source, the instruction does not exhibit an input dependency to the destination register (unless there is register renaming), and so can be faster. For "non-destructive & merging 1" there is an input dependency on the destination register because the non-selected elements of the destination register are being preserved.

Special care may need to be taken for instructions that would normally perform updates of condition flags in systems which support conditional execution. Conditional micro-operations may be executed only if the condition flags indicate a particular state. Some micro-operations may update the condition flags based on their processing result. If a condition flag updating micro-operation is a zero length micro-operation, then in some cases the flag updates may be ignored since often non-selected elements would not affect the flag update in any way. However, if it is possible for a flag update to be required even if there are no selected elements to be processed by a micro-operation, then this could be handled by extending the processing unit 12 which performs the replacement micro-operation to also include functionality for updating the condition flags (which would not normally be the case for a vector move micro-operation for example).

The replacement of the micro-operation may take place either at the dispatch circuitry 24 or at the issue circuitry 26. FIG. 5 shows an example in which the dispatch circuitry 24 performs the replacement. In this case, a vector add instruction (vadd at slot 2) has corresponding mask information VM(0) which indicates that the required portion of the register is entirely made up of non-selected elements. Hence, the add instruction is replaced with a vector move instruction (vmov vv2, vv1). Even though all elements are non-selected elements, the vector move instruction is still dependent on the preceding vector move instruction (vmov at slot 1) because the vmov at slot 1 generates the value to be placed in the source register vv1 for the micro-operation at slot 2. Otherwise, the vector move instruction at slot 2 would operate on the value in register vv1 before the operation at slot 1 was executed rather than the value after the operation at slot 1.

FIGS. 6 and 7 show different examples of a mask register file for storing the control information 28. Multiple mask registers may be provided, and micro-operations may indicate which of the mask registers stores the control information for that micro-operation. It is possible for the dispatch circuitry 24 to determine whether to perform the replacement of the micro-operation based on the original mask data itself. However, in this case the dispatch circuitry would need to combine several bits of the mask information to determine whether the condition required for replacing the operation is satisfied. To speed up checking whether the micro-operation is a zero length micro-operation, each mask register may be extended as shown in FIG. 6 to include an additional control flag 40 which indicates whether all the elements indicated by the mask are selected or non-selected. The additional control indicator 40 shown in FIG. 6 has a value of "false" if any of the bits of the mask is 1 and has a value of "true" if all of the bits of the mask are 0. The additional control indicator 40 may be determined by applying a NOR operation to the bits of the corresponding mask. If the control indicator 40 for a given micro-operation is "true", then the dispatch circuitry 24 can replace the corresponding micro-operation with a faster NOP or vmov micro-operation as discussed above.

FIG. 7 shows a second example of the mask register file in which two control indicators 40, 42 are provided, each corresponding to a different half of the mask. This allows micro-operations which only operate on half of the vector operand to be checked to see if they can be accelerated by replacing the micro-operation with a replacement micro-operation. Similarly, it is possible to generate further control flags corresponding to smaller portions of the mask register (e.g. dividing the mask into 4, 8, 16, etc.).

For FIGS. 6 and 7, each time there is a write to a mask register, then the control circuitry 20 may update the corresponding control indicators 40, 42. This can be achieved by passing the write through a NOR network to set or reset the indicators 40, 42. Typically, the same mask may be used multiple times by different micro-operations before it is updated again, so by updating the flags 40, 42 on a write to the mask register in this way, the processing for generating the flags 40, 42 can be amortized across multiple reads rather than being repeated on every read.

FIG. 8 shows another example of control information 28, comprising a vector length register file which has registers for storing vector length data 44 for different micro-operations. Each micro-operation can specify which register stores the vector length for that micro-operation. The vector length field 44 indicates how many selected data elements are present, and elements at positions higher than the element indicated by the vector length can be assumed to be non-selected. Again, control flags 40, 42 may be determined to indicate whether certain portions are made up entirely of non-selected elements. For example, in FIG. 8 the two flags 40, 42 correspond to the first and second halves of an 8-element vector. If the vector length is 0, then both halves are entirely made up of non-selected elements, and so the two flags 40, 42 are both "true". If the vector length is 4, then flag 40 is "false" and flag 42 is "true" because only the second half of the vector comprises non-selected elements. If the vector length is 8, then all data elements are selected and so both flags are "false". Hence, the dispatch circuitry 24 may use the table shown in FIG. 8 to determine whether to replace a micro-operation.

Figures 9, 10:
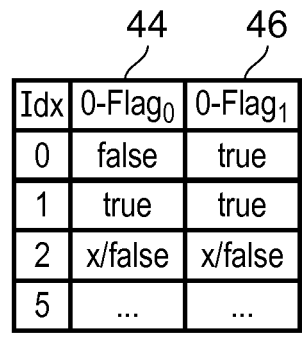
FIG. 9 shows an example of control indicators maintained by the dispatch stage.
FIG. 10 shows an example of replacing a micro-operation at an issue stage.

The dispatch circuitry 24 may also maintain its own table of control indicators 44, 46 as shown in FIG. 9, so that it can determine more quickly whether the mask or vector length for a given operation specifies a block of all non-selected elements than if it had to access the mask/vector length register file which would often be local to the issue queue 26. However, when the detection of zero length micro-operations is performed early at the dispatch stage then there may be some operations for which the corresponding control information 28 is still to be generated by a micro-operation which is in flight in the issue queue 26. Therefore, as well as the "true" and "false" states of the control indicators 44, 46, there may also be a "don't know" state "x". In general, if the control information is not known, then the dispatch circuitry 24 may conservatively assume that there may be at least one selected element, i.e. "x" is treated as "false" so that the micro-operation is not performed and the original micro-operation is dispatched to the issue queue 26. Also, on dispatching an instruction which updates a piece of control information, the dispatch circuitry 24 may set the corresponding flag 44, 46 to indicate x/false. The flags, 44, 46 in FIG. 9 are updated by the dispatch circuitry 24 in response to a corresponding update of the corresponding flag 40, 42 maintained by the issue queue 26 in the mask register file or vector length register file. The issue queue 26 propagates the update of the control flag 40, 42 back to the dispatch circuitry 24 only if the control flag 40, 42 changes state. If the update of the control information does not change the state of the control flag 40, 42, then the flag 44, 46 held by the dispatch circuitry 24 is not updated, to avoid unnecessary traffic between stages (option b below). Alternatively, if the increased traffic of propagating all flag updates back to the dispatch circuitry 24 is acceptable, then the mask/vector length register file need not include the flags 40, 42 and instead the flags 44, 46 maintained by the dispatch circuitry 24 may be the only control flags (option a below).

In summary, the flags 44, 46 shown in FIG. 9 may be updated by the dispatch circuitry 24 as follows:
Invalidate (set to 0) the relevant flag 44, 46 when a micro-operation which writes to the specific mask register is dispatched to the issue queue 26 (in this example, 0 corresponds to x/false in FIG. 9)
Set/Reset the relevant flag 44, 46 on:
a) All updates of the control information, or
b) Only if corresponding flags 40, 42 change after update of the control information.

Option a) increases the interaction between the dispatch stage and issue/execution stages, but does not require an extended register file as shown in FIGS. 6 to 8, while option b) reduces the interaction between the dispatch stage and issue/execution stages.

Detecting the zero-length micro-operations and replacing them at the dispatch stage is relatively simple to implement and has very low impact on subsequent pipeline stages. However, as there may be some in flight updates of the control information then the dispatch stage has to make a conservative estimate of the zero length micro-operations and so this might still result in some execution of zero length micro-operations.

As shown in FIG. 10, another option is for the issue queue 26 to detect the zero length micro-operations and replace them with another micro-operation. This has the advantage that zero length micro-operations can be accelerated even if there is an in flight update of the control information at the point when the micro-operation enters the issue queue. Hence, in the example of FIG. 10 there is a vector add operation in slot 2 behind a younger vset operation which sets the mask register file VM0. The add operation has to wait until the set completes and broadcasts the resulting mask to the issue queue. When the mask is updated then the issue queue 26 also updates the corresponding control flag 40, 42 associated with the mask register file. If this flag is false then the vadd micro-operation proceeds as normal. If the flag is true, then the issue queue 26 replaces the vadd micro-operation with an alternative vector move micro-operation for moving the portion of register vv1 to the corresponding portion of register vv2. If there are multiple different issue queues corresponding to different functional units 12 of the processing circuitry 4, then it may be useful to provide circuitry within the functional unit 12 which would normally carry out the original micro-operation so that it can also carry out the replacement micro-operation, to avoid needing to switch issue queues when replacing the micro-operation.

While some systems may detect and replacement of zero length micro-operations at the dispatch stage 24 and others may do this at the issue stage 26, it is also possible to do the detection and replacement at both stages. This would have the advantage that the dispatch stage would catch some zero length micro-operations at the point when they can be more easily replaced with another operation, while the issue stage will detect a few remaining zero length micro-operations which rely on in flight updates of the control information. This would allow all zero length micro-operations to be detected, while implementing the replacement in the most efficient way possible for a given micro-operation, so that there may be a better balance between performance improvement and circuit/processing complexity.

Figure 11:
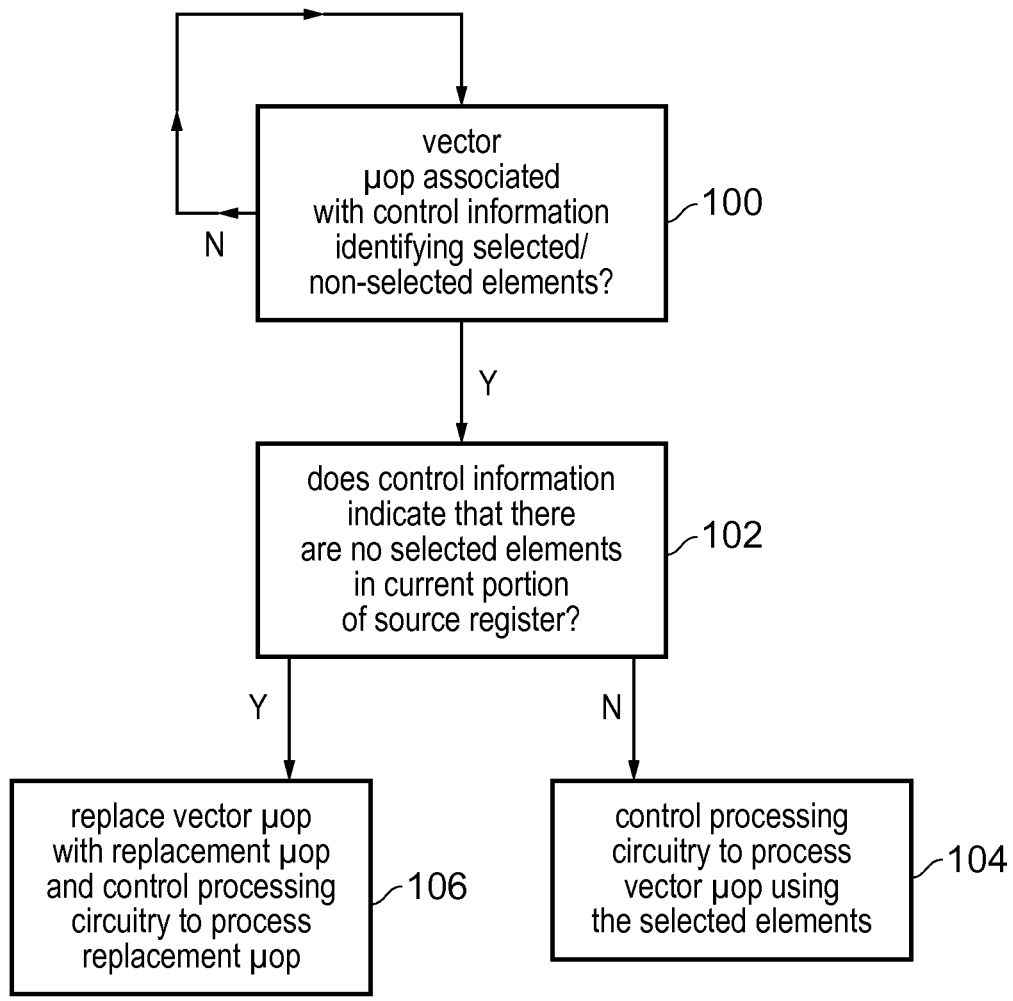
FIG. 11 illustrates a method of processing vector operations.

FIG. 11 shows a method of performing vector processing. At step 100 the control circuitry 20 detects whether there is a pending vector micro-operation which has control information identifying which elements are selected elements and non-selected elements. When such an operation is detected then at step 102 it is determined whether the control information indicates that there are no selected elements in the current portion of the source register or registers. This can be done either from the control information itself, or from a derived parameter such as the control flags 40, 42, 44, 46 as discussed above. If there is at least one selected element, then at step 104 the control circuitry 20 controls the processing circuitry 4 to process the vector micro-operation in its original form using the selected elements. If there are no selected elements, then at step 106 the vector micro-operation is replaced with a replacement micro-operation and the processing circuitry 4 is controlled to process the replacement micro-operation instead of the original micro-operation. The replacement micro-operation can be processed in fewer cycles than the original micro-operation, and so the replacement improves performance.

Figure 12:
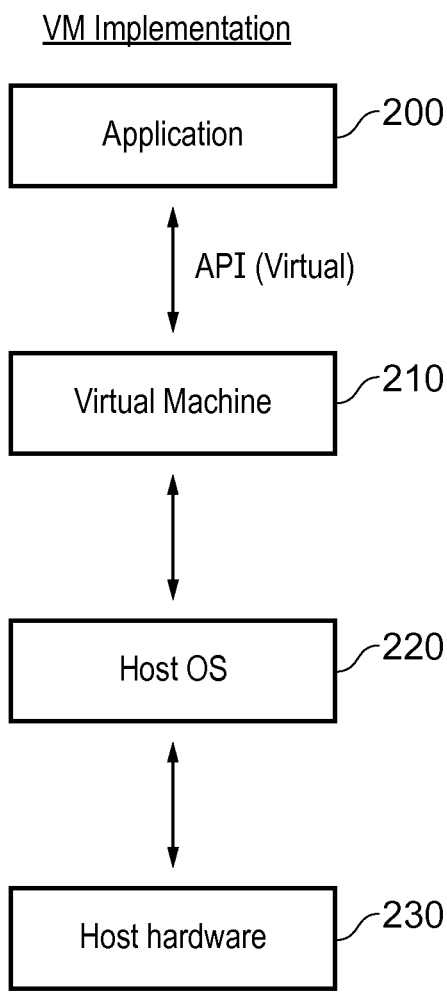
FIG. 12 illustrates a virtual machine implementation of the present technique.

FIG. 12 illustrates a virtual machine implementation that may be used. While the earlier described embodiments implement the present invention in terms of apparatus and methods for operating specific processing hardware supporting the techniques concerned, it is also possible to provide so-called virtual machine implementations of hardware devices. These virtual machine implementations run on a host processor 230 typically running a host operating system 220 supporting a virtual machine program 210. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 210 is capable of executing an application program (or operating system) 200 to give the same results as would be given by execution of the program by a real hardware device. Thus, the program instructions, including the control of memory accesses described above, may be executed from within the application program 200 using the virtual machine program 210.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the claims are not limited to those precise embodiments, and that various changes and modifications can be effected therein by one skilled in the art without departing from the scope defined by the appended claims.

The invention claimed is:

1. A data processing apparatus comprising:
   a vector register store configured to store vector operands comprising a plurality of data elements;
   processing circuitry configured to perform vector processing using vector operands obtained from the vector register store; and
   control circuitry configured to control said processing circuitry to perform the vector processing in response to vector micro-operations;
   wherein in response to a vector micro-operation specifying a source vector register and a destination vector register of said vector register store, wherein a portion of the source vector register comprises a plurality of contiguous data elements and each data element within the portion is either a selected element or a non-selected element, and wherein the vector micro-operation is associated with control information indicating, for each data element of the portion of the source vector register, whether that data element is a selected element or a non-selected element, the control circuitry is configured to:
   (a) detect whether the control information satisfies a predetermined condition indicating that all elements in said portion of the source vector register are non-selected elements;
   (b) if the control information does not satisfy said predetermined condition, control the processing circuitry to process said vector micro-operation to perform a predetermined processing operation using one or more selected elements of said portion of said source vector register, to generate a result to be stored to a portion of the destination vector register corresponding to said portion of the source vector register; and
   (c) if the control information satisfies said predetermined condition, replace said vector micro-operation with a replacement micro-operation having a lower processing latency than said vector micro-operation and providing the same result for said portion of the destination register as said vector micro-operation in the case where the control information satisfies said predetermined condition, and control the processing circuitry to process said replacement micro-operation.

2. The data processing apparatus according to claim 1, wherein said portion of the source vector register comprises the whole of the source vector register, and said portion of the destination vector register comprises the whole of the destination vector register.

3. The data processing apparatus according to claim 1, wherein the replacement micro-operation comprises one of a no-op micro-operation, a micro-operation for setting said at least a portion of said destination vector register to the same value as part of the source vector register, and a micro-operation for setting said at least a portion of said destination vector register to a predetermined value.

4. The data processing apparatus according to claim 1, wherein in response to a first type of said vector micro-operation, the control circuitry is configured to control the processing circuitry to set to a predetermined value data elements of said portion of the destination vector register that correspond to non-selected data elements of said portion of the source vector register.

5. The data processing apparatus according to claim 4, wherein for said first type of said vector micro-operation, the replacement micro-operation comprises a micro-operation for setting said portion of said destination vector register to said predetermined value.

6. The data processing apparatus according to claim 1, wherein in response to a second type of said vector micro-operation, the control circuitry is configured to control the processing circuitry such that data elements of said portion of the destination vector register corresponding to non-selected data elements of said portion of said source vector register have the same values as the corresponding non-selected data elements of said portion of said source vector register.

7. The data processing apparatus according to claim 6, wherein if said second type of said vector micro-operation specifies the same register as said source vector register and said destination vector register, the replacement micro-operation comprises a no-op micro-operation.

8. The data processing apparatus according to claim 6, wherein if said second type of said vector micro-operation specifies the same register as said source vector register and said destination vector register, the replacement micro-operation comprises a micro-operation for setting said at least a portion of said destination vector register to the same value as a corresponding portion of the source vector register.

9. The data processing apparatus according to claim 6, wherein if said second type of said vector micro-operation specifies different registers as said source vector register and said destination vector register, the replacement micro-operation comprises a micro-operation for setting said at least a portion of said destination vector register to the same value as a corresponding portion of the source vector register.

10. The data processing apparatus according to claim 1, wherein in response to a second type of said vector micro-operation, the control circuitry is configured to control the processing circuitry such that values of data elements of said portion of the destination vector register corresponding to non-selected data elements of said portion of said source vector register are preserved.

11. The data processing apparatus according to claim 1, wherein the control information comprises at least one of:
   (i) mask information specifying which particular data elements or groups of data elements of said portion of said source vector register are selected data elements, said predetermined condition being satisfied if the mask information indicates that none of the data elements of said portion of said source vector register are selected data elements;
   (ii) vector length information indicative of a number of data elements to be processed in response to said vector micro-operation, said predetermined condition being satisfied if said vector length information has one of one or more predetermined values; and
   (iii) vector format information specifying a format of a vector operand stored in the source vector register or the destination vector register, said predetermined condition being satisfied if said vector format information has one of one or more predetermined values.

12. The data processing apparatus according to claim 1, wherein the control circuitry is configured to maintain a control indicator indicative of whether said control information indicates that all of said data elements of said portion of the source vector register are non-selected data elements, and to determine that said predetermined condition is satisfied if said control indicator has a predetermined value.

13. The data processing apparatus according to claim 12, wherein said control circuitry is configured to determine the control indicator in response to an update of the control information.

14. The data processing apparatus according to claim 1, wherein the control circuitry comprises dispatch circuitry and issue circuitry;
the dispatch circuitry is configured to decode micro-operations and dispatch decoded micro-operations to the issue circuitry; and
the issue circuitry is configured to issue micro-operations for processing by the processing circuitry.

15. The data processing apparatus according to claim 14, wherein the dispatch circuitry is configured to detect whether the control information satisfies said predetermined condition, and to dispatch said replacement micro-operation to the issue circuitry instead of said vector micro-operation if the control information satisfies said predetermined condition.

16. The data processing apparatus according to claim 15, wherein the dispatch circuitry is configured to dispatch said vector micro-operation to said issue circuitry without replacing the vector micro-operation with the replacement micro-operation if the dispatch circuitry detects that the control information for said vector micro-operation is still to be updated based on the result of another micro-operation.

17. The data processing apparatus according to claim 15, wherein the dispatch circuitry is configured to maintain a first control indicator indicative of whether said control information indicates that all of said data elements of said portion of the source vector register are non-selected data elements, and to determine whether said predetermined condition is satisfied based on the first control indicator.

18. The data processing apparatus according to claim 17, wherein the issue circuitry is configured to maintain a second control indicator indicative of whether said control information indicates that all of said data elements of said portion of the source vector register are non-selected data elements; and
in response to an update of said control information, said issue circuitry is configured to trigger said dispatch circuitry to update said first control indicator if said update of said control information causes an update to said second control indicator.

19. The data processing apparatus according to claim 17, wherein in response to dispatching an instruction for setting the control information, the dispatch circuitry is configured to set the first control indicator to indicate that said control information indicates that not all of said data elements of said portion of the source vector register are non-selected data elements.

20. The data processing apparatus according to claim 14, wherein the issue circuitry is configured to detect whether the control information satisfies said predetermined condition, and to replace said vector micro-operation with said replacement micro-operation if the control information satisfies said predetermined condition.

21. The data processing apparatus according to claim 1, wherein the vector operands comprise a variable number of data elements having a data element size selected from a plurality of data element sizes.

22. A data processing apparatus comprising:
vector register storage means for storing vector operands comprising a plurality of data elements;
processing means for performing vector processing using vector operands obtained from the vector register storage means; and
control means for controlling said processing means to perform the vector processing in response to vector micro-operations;
wherein in response to a vector micro-operation specifying a source vector register and a destination vector register of said vector register storage means, wherein a portion of the source vector register comprises a plurality of contiguous data elements and each data element within the portion is either a selected element or a non-selected element, and wherein the vector micro-operation is associated with control information indicating, for each data element of the portion of the source vector register, whether that data element is a selected element or a non-selected element, the control means is configured to:
(a) detect whether the control information satisfies a predetermined condition indicating that all elements in said portion of the source vector register are non-selected elements;
(b) if the control information does not satisfy said predetermined condition, control the processing means to process said vector micro-operation to perform a predetermined processing operation using one or more selected elements of said portion of said source vector register, to generate a result to be stored to a portion of the destination vector register corresponding to said portion of the source vector register; and
(c) if the control information satisfies said predetermined condition, replace said vector micro-operation with a replacement micro-operation having a lower processing latency than said vector micro-operation and providing the same result for said portion of the destination register as said vector micro-operation in the case where the control information satisfies said predetermined condition, and control the processing means to process said replacement micro-operation.

23. A method of processing data for an apparatus comprising a vector register store configured to store vector operands comprising a plurality of data elements, and processing circuitry configured to perform vector processing using vector operands obtained from the vector register store; the method comprising:
receiving a vector micro-operation specifying a source vector register and a destination vector register of said vector register store, wherein a portion of the source vector register comprises a plurality of contiguous data elements and each data element within the portion is either a selected element or a non-selected element, and wherein the vector micro-operation is associated with control information indicating, for each data element of the portion of the source vector register, whether that data element is a selected element or a non-selected element;
in response to the vector micro-operation, detecting whether the control information satisfies a predetermined condition indicating that all elements in said portion of the source vector register are non-selected elements;

if the control information does not satisfy said predetermined condition, controlling the processing circuitry to process said vector micro-operation to perform a predetermined processing operation using one or more selected elements of said portion of said source vector register, to generate a result to be stored to a portion of the destination vector register corresponding to said portion of the source vector register; and if the control information satisfies said predetermined condition, replacing said vector micro-operation with a replacement micro-operation having a lower processing latency than said vector micro-operation and providing the same result for said portion of the destination register as said vector micro-operation in the case where the control information satisfies said predetermined condition, and controlling the processing circuitry to process said replacement micro-operation.

24. A non-transitory computer-readable storage medium storing a computer program which, when executed by a computer, provides a virtual execution environment corresponding to the data processing apparatus according to claim 1.

* * * * *